(12) United States Patent
Tsunoda et al.

(10) Patent No.: US 10,584,879 B2
(45) Date of Patent: Mar. 10, 2020

(54) COMBUSTOR INCLUDING A FLOW GUIDE INTRODUCTION PORTION CONNECTED TO A FLOW GUIDE MAIN BODY PORTION, AND A GAS TURBINE

(71) Applicant: MITSUBISHI HITACHI POWER SYSTEMS, LTD., Kanagawa (JP)

(72) Inventors: Naoki Tsunoda, Tokyo (JP); Satoshi Takiguchi, Tokyo (JP); Shinji Akamatsu, Yokohama (JP); Koichi Nishida, Yokohama (JP); Katsunori Tanaka, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 344 days.

(21) Appl. No.: 15/510,313

(22) PCT Filed: Sep. 18, 2015

(86) PCT No.: PCT/JP2015/076754
§ 371 (c)(1),
(2) Date: Mar. 10, 2017

(87) PCT Pub. No.: WO2016/047624
PCT Pub. Date: Mar. 31, 2016

(65) Prior Publication Data
US 2017/0292707 A1 Oct. 12, 2017

(30) Foreign Application Priority Data
Sep. 25, 2014 (JP) .................................. 2014-195036

(51) Int. Cl.
*F23R 3/16* (2006.01)
*F01D 9/02* (2006.01)
(Continued)

(52) U.S. Cl.
CPC ................. *F23R 3/16* (2013.01); *F01D 9/023* (2013.01); *F01D 25/12* (2013.01); *F02C 3/04* (2013.01);
(Continued)

(58) Field of Classification Search
CPC .... F23R 3/48; F23R 3/04; F23R 3/045; F23R 3/08; F23R 3/16; F02C 3/04; F02C 7/18;
(Continued)

(56) References Cited

U.S. PATENT DOCUMENTS 3,184,918 A * 5/1965 Mulcahey ................. F23R 3/48
60/39.37
5,402,635 A * 4/1995 Smith ....................... F23R 3/48
60/39.37
(Continued)

FOREIGN PATENT DOCUMENTS

JP 41-4123 3/1966
JP 56-117273 9/1981
(Continued)

OTHER PUBLICATIONS

International Search Report dated Dec. 28, 2015 in corresponding International (PCT) Application No. PCT/JP2015/076754, with English translation.
(Continued)

*Primary Examiner* — Jason H Duger
(74) *Attorney, Agent, or Firm* — Wenderoth, Lind & Ponack, L.L.P.

(57) ABSTRACT

A combustor including a combustor main body having a transition piece that defines a flow channel therein, and a combustor basket inserted in the transition piece from an upstream side of the flow channel that defines a gap through which a film air is sent with an inner peripheral surface of the transition piece; a connecting pipe disposed upstream of
(Continued)

an outlet of the gap that connects to the combustor main body from an outer peripheral side and communicates with the flow channel via a connection hole; and a flow guide disposed at an identical position to the outlet of the gap on a downstream side of a connecting portion of the connecting pipe and the combustor main body that guides a compressed air introduced from outside the connecting pipe so that a flow rate distribution is made uniform in a circumferential direction of the combustor main body.

4 Claims, 3 Drawing Sheets

(51) Int. Cl.
    *F23R 3/42*     (2006.01)
    *F02C 7/18*     (2006.01)
    *F01D 25/12*     (2006.01)
    *F02C 3/04*     (2006.01)

(52) U.S. Cl.
    CPC .................. *F02C 7/18* (2013.01); *F23R 3/42* (2013.01); *F05D 2220/32* (2013.01); *F05D 2260/20* (2013.01); *F05D 2260/202* (2013.01); *F23R 2900/03042* (2013.01)

(58) Field of Classification Search
    CPC ...... F01D 9/023; F01D 25/12; F05D 2260/20; F05D 2260/202; F05D 2260/03042
    See application file for complete search history.

(56) References Cited

U.S. PATENT DOCUMENTS

| | | |
|---|---|---|
| 6,701,713 B2 | 3/2004 | Mandai et al. |
| 2013/0298564 A1 | 11/2013 | Agarwal |

FOREIGN PATENT DOCUMENTS

| | | |
|---|---|---|
| JP | 7-83439 | 3/1995 |
| JP | 2004-44897 | 2/2004 |
| JP | 2004-92409 | 3/2004 |
| JP | 3694337 | 9/2005 |
| TW | 362128 | 6/1999 |
| WO | 2014/141825 | 9/2014 |

OTHER PUBLICATIONS

Written Opinion of the International Searching Authority dated Dec. 28, 2015 in corresponding International (PCT) Application No. PCT/JP2015/076754, with English translation.

Office Action dated Jul. 26, 2016 in corresponding Taiwanese Application No. 104131272, with English translation.

* cited by examiner

COMBUSTOR INCLUDING A FLOW GUIDE INTRODUCTION PORTION CONNECTED TO A FLOW GUIDE MAIN BODY PORTION, AND A GAS TURBINE

TECHNICAL FIELD

The present invention relates to a combustor and a gas turbine provided with the same.

This application claims priority based on Japanese Patent Application No. 2014-195036 filed in Japan on Sep. 25, 2014, of which the contents are incorporated herein by reference.

BACKGROUND ART

A gas turbine includes a compressor that generates compressed air, a combustor that combusts fuel in the compressed air to generate combustion gas, and a turbine that is driven in rotation by the combustion gas. The combustor includes a combustor basket where fuel and air are supplied and a transition piece where combustion gas is generated after the fuel and air supplied to the combustor basket are ignited therein.

In some conventional gas turbines, film air is supplied from a gap between the outer ring of the outlet that composes a leading end portion of the combustor basket and the transition piece to prevent the combustion gas generated in the transition piece from damaging the internal wall surface of the transition piece.

It is common for actual gas turbines to have a configuration with a plurality of combustors disposed around the periphery of the gas turbine and these combustors being connected via a connecting pipe. In such a configuration, one combustor is provided with an ignition plug, and the flame produced in this combustor is then spread to other combustors via the connecting pipe to ignite all of the combustors. When combustors are provided with a connecting pipe as such, specifically, an opening is formed in the wall of the combustor basket of the combustor, and adjacent combustors are connected at the opening via the connecting pipe. Additionally, such a connecting pipe needs to be protected from the heat by film air in the same manner as the combustor basket and the transition piece of the combustors.

Patent Document 1 describes known technology for protecting a connecting pipe via film air. In the combustor described in Patent Document 1, the inside of the connecting pipe (bypass pipe) is provided with a sleeve that defines a flow channel. By supplying air through the flow channel, the side wall of the bypass pipe is supplied with film air.

CITATION LIST

Patent Document

Patent Document 1: Japanese Unexamined Patent Application Publication No. 2004-092409A

SUMMARY OF INVENTION

Technical Problems

However, in the combustor described in Patent Document 1 the film air supplied to protect the bypass pipe can disrupt the flow of the compressed air in the flow channel inside the combustor. The film air separates particularly in the region near where the bypass pipe is connected. Thus, the combustor may be damaged.

Solution to Problems

A first aspect of the present invention is a combustor comprising: a combustor main body comprising a transition piece that defines a flow channel therein, and a combustor basket inserted in the transition piece from an upstream side of the flow channel that sends a combustion gas through the flow channel and defines a gap through which a film air is sent with an inner peripheral surface of the transition piece; a connecting pipe disposed upstream of an outlet of the gap that connects to the combustor main body from an outer peripheral side and communicates with the flow channel; and a flow guide disposed in the flow channel on a downstream side of a connecting portion of the connecting pipe and the combustor main body that guides a compressed air introduced from outside the connecting pipe so that a flow rate distribution is made uniform in a circumferential direction of the combustor main body.

According to the configuration described above, the flow guide is provided on the downstream side of the connecting portion of the connecting pipe and the combustor main body. Because of this, film air can be guided to the flow channel on the downstream side of the connecting pipe. By the compressed air being guided by the flow guide, the flow rate distribution of the compressed air can be made uniform in the circumferential direction of the combustor main body.

A second aspect of the present invention is the combustor according to the first aspect, wherein the connecting portion includes an intake hole that connects an inside and outside of the connecting portion; and the flow guide includes an introduction portion disposed proximal to the connecting pipe that extends from the intake hole toward the flow channel, and a flow guide main body portion connected to the introduction portion that extends toward the downstream side of the flow channel.

According to the configuration described above, the outside compressed air can be taken in from the intake hole provided on the connecting pipe and sent to the flow channel on the downstream side of the connecting pipe. Because of this, the flow rate distribution of the compressed air can be made uniform in the circumferential direction of the combustor main body.

A third aspect of the present invention is the combustor according the second aspect, wherein the flow guide main body portion gradually increases in dimension in the circumferential direction toward the downstream side of the flow channel.

According to the configuration described above, the compressed air can be supplied as film air to a wide region on the downstream side of the connecting pipe.

A fourth aspect of the present invention is a gas turbine comprising a compressor that generates the compressed air; the combustor according to any one of the aspects described above; and a turbine driven by a combustion gas generated by the combustor.

According to the configuration described above, a gas turbine with a highly durable combustor can be provided.

Advantageous Effects of Invention

According to the combustor and the gas turbine described above, the chance of damage to the combustor can be effectively reduced.

DESCRIPTION OF EMBODIMENT

A first embodiment of the present invention will be described below with reference to the drawings.

Figure 1:
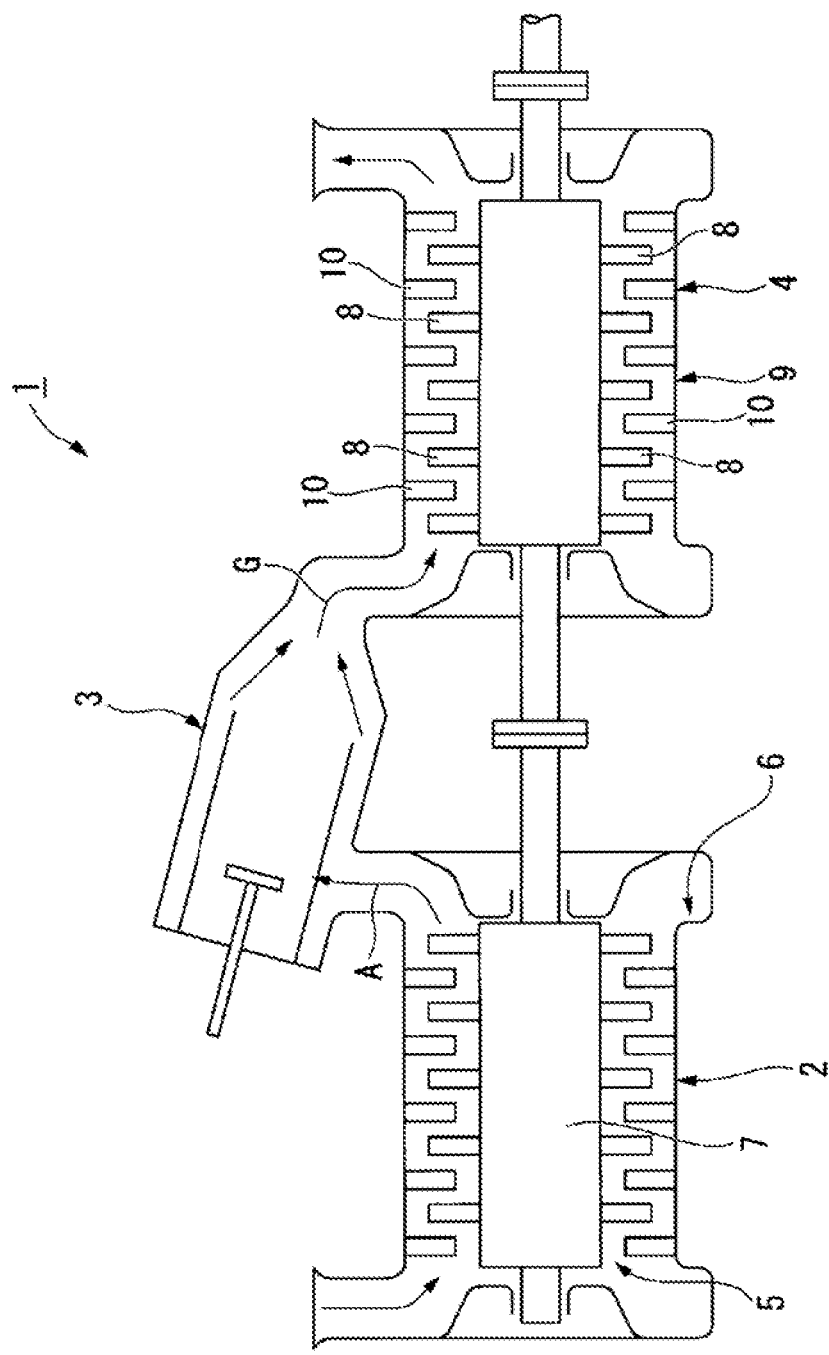
FIG. 1 is schematic diagram of a gas turbine according to an embodiment of the present invention.

As illustrated in FIG. 1, a gas turbine 1 according to the present embodiment includes a compressor 2 that compresses air taken in to the compressor 2 in large volumes, a combustor 3 that combusts a mixture of compressed air A compressed at the compressor 2 and fuel, and a turbine 4 that converts thermal energy of a combustion gas G introduced from the combustor 3 into rotational energy.

The compressor 2 and the turbine 4 each include a rotor 5 and a stator 6 that covers the outer peripheral side of the rotor 5. The rotors 5 are connected to rotate as a single body. The rotor 5 includes a rotating shaft 7 and a plurality of annular blade assemblies 8 fixed at intervals in the axial line O direction. The annular blade assemblies 8 each include a plurality of blades fixed on the periphery of the rotating shaft 7 at intervals in the circumferential direction.

The stator 6 includes a casing 9 and a plurality of annular vane assemblies 10 fixed inside the casing 9 at intervals in the axial line O direction. The annular vane assemblies 10 each include a plurality of vanes fixed on the inner surface of the easing 9 at intervals in the circumferential direction.

The annular vane assemblies 10 and the annular blade assemblies 8 are alternately arranged in the axial line O direction.

Figure 2:
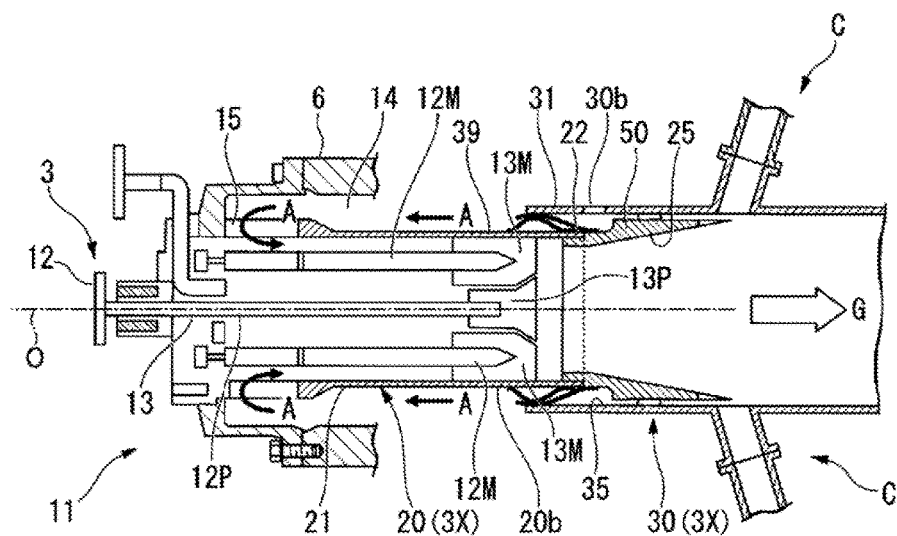
FIG. 2 is a schematic diagram of a cross section of a combustor according to the embodiment of the present invention as viewed from a direction orthogonal to the axial line of the combustor.

As illustrated in FIG. 2, the combustor 3 includes a fuel supply unit 11 that sprays compressed air A from the compressor 2 and fuel, a combustor basket 20 where the compressed air A and the fuel from the fuel supply unit 11 are supplied to, and a transition piece 30 through which the combustion gas G generated from the compressed air A and the fuel sent from the combustor basket 20 is sent to the turbine 4. The combustor basket 20 and the transition piece 30 of the combustor 3 are both disposed within the casing of the turbine 4. Additionally, the combustor basket 20 and the transition piece 30 compose a combustor main body 3X.

In the present embodiment, a plurality of combustors 3 are disposed around the periphery of the casing 9 of the gas turbine 1. The plurality of combustors 3 are connected via a connecting portion C. One combustor of the plurality of combustors 3 is provided with an ignition plug, and the flame produced in this combustor is then spread to other combustors via the connecting portion C to ignite all of the combustors.

The combustor basket 20 includes an cylindrical combustor basket main body portion 39 disposed on one side of the combustor basket 20 and an annular outlet outer ring 50 disposed on the other side of the combustor basket 20. The fuel supply unit 11 is disposed on one end of the combustor basket 20, and an opening 25 is formed on the other end. The outlet outer ring 50 forms the leading end of the combustor basket 20.

Note that in the description below, one end of the combustor basket main body portion 39 is defined as a base end portion 21, the other end is defined as a leading end portion 22, the base end portion 21 side is defined as the upstream side, and the leading end portion 22 side is defined as the downstream side. Additionally, a direction of the axial line O of the combustor basket 20 is defined as the axial Fine direction, the circular direction about the axial line O is defined as the circumferential direction, and the radial direction of this circle is defined as the radial direction.

The transition piece 30 is a part with a tubular shape like that of the combustor basket 20. The inside of the transition piece 30 is hollow from one end to the other, and an opening 35 is formed at one end. The inner diameter of the opening 35 is larger than the outer diameter of the leading end portion 22 and the outlet outer ring 50 of the combustor basket 20. Note that below, the end on the upstream side of the transition piece 30 is defined as a base end portion 31. The leading end portion 22 and the outlet outer ring 50 of the combustor basket main body portion 39 are inserted in the base end portion 31 of the transition piece 30. The downstream end of the transition piece 30 is connected to a combustion flow path of the turbine 4.

The fuel supply unit 11 is fixed to the easing 9. The base end portion 21 of the combustor basket 20 is supported by the fuel supply unit 11. Additionally, the leading end portion 22 of the combustor basket main body portion 39 is supported by the base end portion 31 of the transition piece 30 and a non-illustrated support part provided on the casing 9.

The fuel supply unit 11 includes a pilot burner 12P and a plurality of main burners 12M. The pilot burner 12P is provided on the axial line O of the combustor 3. The pilot burner 12P sprays supplied fuel from a pilot nozzle 13P. A flame is generated by the ignition of the fuel sprayed from the pilot nozzle 13P.

Though no detailed drawing is provided, a pilot cone is provided on the pilot burner 12P. The pilot cone is a tubular part that covers the outer peripheral side of the pilot nozzle 13P. The pilot cone is provided to increase the flame stability by regulating the diffusion region and direction the flames.

Additionally, the plurality of main burners 12M are provided inside the combustor basket 20. Specifically, the plurality of main burners 12M are arranged at equal intervals in the circumferential direction on the outer peripheral side of the pilot burner 12P. The main burners 12M each extend along the axial line O of the combustor basket 20. In other words, the main burners 12M are each parallel with the pilot burner 12P.

A main nozzle 13M is provided on the leading end portion of the main burner 12M. Fuel is sprayed from a non-illustrated fuel nozzle at the main burner 12M configuration as such. The sprayed fuel mixes with the compressed air A inside the combustor basket 20 to generate a premixed gas. The premixed gas is ignited by the flames formed at the pilot burner 12P and premixed diffusion flames are generated inside the transition piece 30. The combusted premixed gas then flows toward the turbine 4 as the combustion gas G.

The gas turbine 1 according to the present embodiment includes a plurality of combustor 3 disposed at intervals around the periphery of the casing 9. The plurality of combustors 3 are connected to one another via the connecting portion C. In other words, the flames generated at one combustor 3 spreads to other adjacent combustors 3 through the connecting portion C. Accordingly, by the flames spreading to all of the combustors 3 arranged in the circumferential direction, the combustion gas G is supplied with a uniform temperature distribution throughout the turbine 4.

Figure 3:
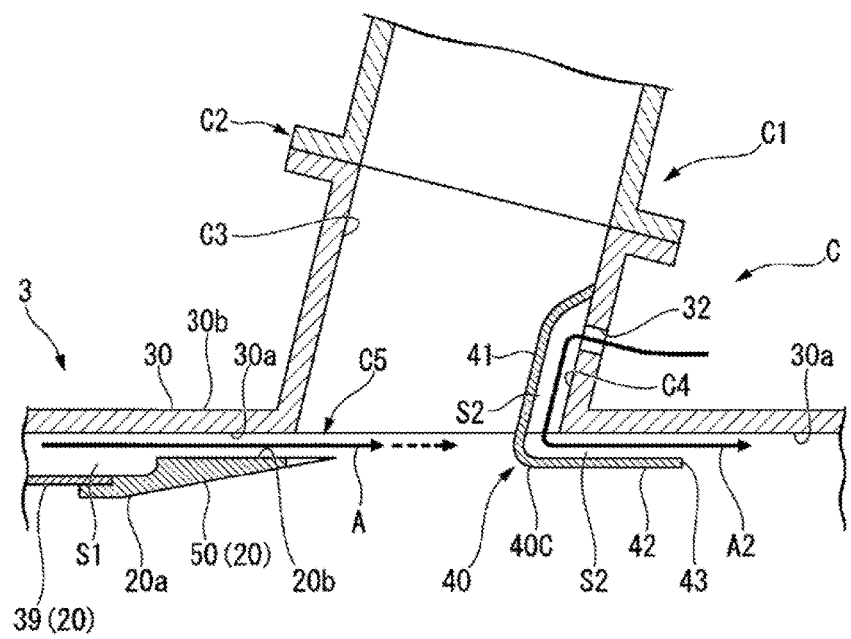
FIG. 3 is a cross-sectional view illustrating a main portion of the combustor according to the embodiment of the present invention.

As illustrated in FIG. 3, the connecting portion C includes a connecting pipe C1, which is a pipe part that connects two adjacent combustors 3, 3, and a fixing portion C2 where the connecting pipe C1 is fixed to the combustor 3.

The inner diameter of the connecting pipe C1 is approximately identical to that of a connection hole C3 provided on the outer wall of the transition piece 30 of the combustor 3. A flow channel for spreading flames generated at the combustor 3 to other combustors 3 is formed inside the connecting pipe C1. The connection hole C3 is a tubular part that protrudes outward in the radial direction of the combustor 3 from an outer peripheral surface 30b of the transition piece 30. Additionally, the connection hole C3 is attached to the transition piece 30 to incline at a certain angle with respect to the axial line O.

Connecting the end of the connecting pipe C1 to the connection hole C3 causes adjacent combustors 3, 3 to be connected. Additionally, the connecting pipe C1 and the connection hole C3 are fixed together in an undetachable manner via the fixing portion C2. The configuration of the fixing portion C2 is not illustrated in detail, however the fixing portion C2 may be constituted by a flange portion provided on both the connecting pipe C1 and the connection hole C3, and the flange portion are fastened together via a screw or bolt, for example. Additionally, a seal member or the like may be provided in the fixing portion C2 to suppress leakage of the combustion gas G flowing therethrough. Furthermore, the portion where the connection hole C3 and the inner peripheral surface 30a of the transition piece 30 are connected has a corner, which forms an interface portion C5.

An intake hole 32 is provided on the connecting portion C to introduce the compressed air A from outside thereof. The intake hole 32 is provided on the wall of the connection hole C3 of the connecting portion C and is a through-hole that connects the inside and outside of the connecting portion C. Specifically, the intake hole 32 is provided on the wall on the downstream side of the connection hole C3.

Additionally, a flow guide 40 is provided in the combustor 3 to send the compressed air A introduced from outside via the connection hole C3 to the downstream side of the connecting portion C inside the combustor basket 20. The flow guide 40 is provided at a position substantially identical to a position corresponding to an outlet of a gap S1, in other words, the interface portion C5.

Specifically, as illustrated in FIG. 3, the flow guide 40 includes an introduction portion 41 that covers the intake hole 32 from the side distal from the axial line O and extends towards the flow channel in the transition piece 30, and a flow guide main body portion 42 that extends from the end of the introduction portion 41 proximal to the axial line O along the extension direction of the flow channel. The introduction portion 41 and the flow guide main body portion 42 are connected via a connecting portion 40C. The connecting portion 40C may be gently curved so as not to obstruct the behavior of the fluid. Additionally, the flow guide 40 according to the present embodiment has an even surface.

The introduction portion 41 of the flow guide 40 and an inner peripheral surface C4 of the connection hole C3 are disposed separated by a gap S2. In a similar manner, the flow guide main body portion 42 and the inner peripheral surface 30a of the transition piece 30 are disposed separated by the gap S2.

Additionally, the introduction portion 41 has a shape that conforms to the shape of the inner peripheral surface C4 of the connection hole C3. In the present embodiment, as the cross sectional shape of the connection hole C3 as viewed from the axial line direction of the connection hole C3 is circular, the introduction portion 41 has an arcuate cross section to conform to this circular cross section.

Figure 4:
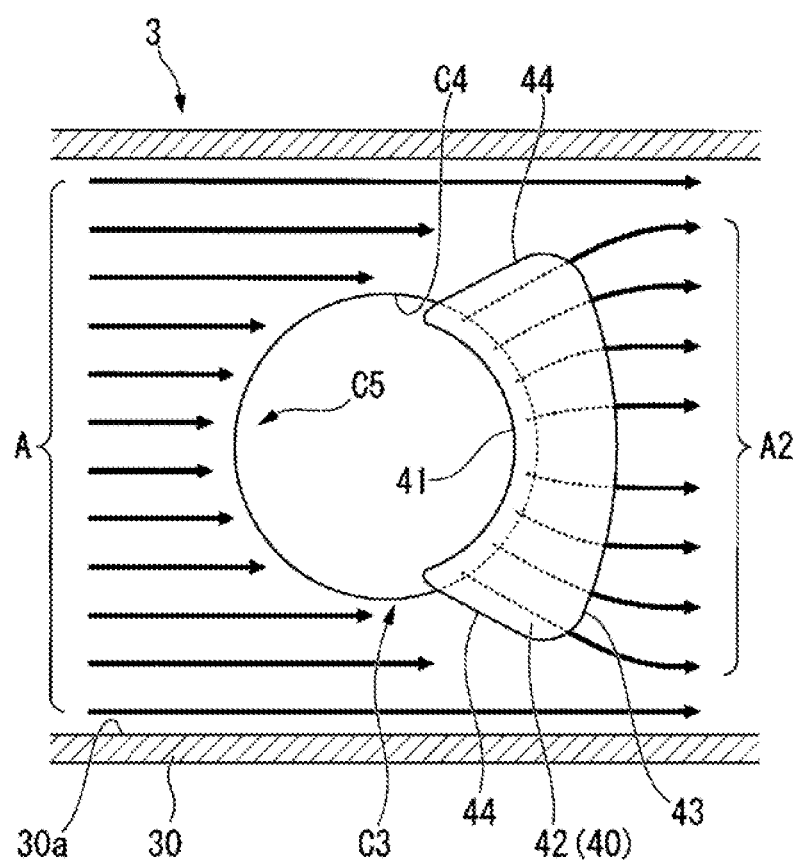
FIG. 4 is a schematic diagram of a cross section of a connecting portion of the combustor according to the embodiment of the present invention as viewed from the axial line direction of a connection hole.

As illustrated in FIG. 4, the flow guide main body portion 42 extends with a sector-like shape toward the downstream side of the flow channel from the connection hole C3. Specifically, the flow guide main body portion 42 includes an outer edge 43 dimensioned to be roughly concentric with the arcuate cross section of the introduction portion 41, and a pair of side edges 44, 44 that join together the opposite ends of the outer edge 43 and the introduction portion 41. In other words, the flow guide main body portion 42 gradually increases in dimension in the circumferential direction from the introduction portion 41 toward the downstream side.

Next, the operation of the gas turbine 1 according to the present embodiment is explained. In the gas turbine 1, the compressed air A compressed at the compressor 2 flows through a flow channel 14 (see FIG. 2) defined by the outer peripheral surface 30b of the transition piece 30 and an outer peripheral surface 20b of the combustor basket 20 and the inner peripheral surface of the casing 9. The compressed air A is then inverted at an inverting portion 15 before entering the combustor basket 20.

The combustion gas G generated by the combustion of the pilot fuel and the main fuel is sent from the transition piece 30 into a turbine gas flow channel (not illustrated). The combustion gas G that enters the turbine gas flow channel drives the rotor 5 in rotation as described above.

As illustrated in FIG. 3, the compressed air A is also taken in to the gap S1 between the transition piece 30 and the combustor basket 20. The introduced compressed air A is sent from the gap S1 between the transition piece 30 and the outlet outer ring 50 along the inner peripheral surface 30a of the transition piece 30.

A portion of the compressed air A sent through the transition piece 30 forms a thin film (layer of film air) on the inner peripheral surface 30a of the transition piece 30. The film of compressed air A film-cools the inner peripheral surface 30a of the transition piece 30. Such film cooling protects the transition piece 30 from the radiant heat generated by the ignition of the fuel and compressed air A supplied from the opening 25 of the combustor basket 20. Note that the compressed air A not used for film cooling is mainly used as combustion air.

Here, the behavior of the compressed air A in the region near the connecting portion C will be described with reference to FIGS. 3 and 4. When the compressed air A that flows through the gap S1 between the combustor basket 20 and the transition piece 30 reaches the connecting portion C, the flow is made turbulent by the corner formed at the interface portion C5 between the inner peripheral surface 30a of the transition piece 30 and the connecting portion C. This turbulence causes the compressed air A to separate from the inner peripheral surface 30a of the transition piece 30. Thus, the compressed air A is less likely to reach the downstream side of the connection hole C3.

However, the combustor 3 according to the present embodiment includes the intake hole 32 provided on the wall of the connection hole C3 as described above, and the flow guide 40 that extends from the region near the intake hole 32 to the flow channel inside the transition piece 30. Supplementary air A2 having the same pressure as the compressed air A is supplied from the intake hole 32. The supplementary air A2 flows through the gap S2 defined by the flow guide 40 and the connection hole C3 and the inner peripheral surface 30a of the transition piece 30.

The supplementary air A2 that flows through the gap S2 is guided by the introduction portion 41 and the flow guide main body portion 42 of the flow guide 40 and sent toward the downstream side of the transition piece 30. The supplementary air A2 sent to the downstream side of the transition piece 30 flows along the inner peripheral surface 30a of the transition piece 30 in a similar manner to the compressed air A acting as the film air described above. In other words, film-cooling the inner peripheral surface 30a of the transition piece 30 at the downstream side of the connecting portion C protects the transition piece 30 from radiant heat from the flames and the like.

Additionally, the flow guide main body portion 42 described above expands in a sector-like shape from the connection hole C3 toward the downstream side. This allows the supplementary air A2 guided by the flow guide 40 to be sent spreading out from the connection hole C3 toward the downstream side conforming to the shape of the flow guide main body portion 42.

As described above, the flow guide 40 is provided on the connecting portion C of the connecting pipe C1 and the combustor main body 3X (combustor basket 20, transition piece 30). Because of this, film air (supplementary air A2) can be guided to the flow channel through the transition piece 30 on the downstream side of the connecting pipe C1. Accordingly, the chance of damage to the inner peripheral surface 30a of the transition piece 30 can be reduced.

Additionally, according to the configuration described above, the outside compressed air A (supplementary air A2) can be taken in from the intake hole 32 provided on the connecting portion C and sent to the flow channel on the downstream side of the connecting pipe C1. Because of this, the flow rate distribution of the compressed air A can be made uniform in the circumferential direction of the combustor main body 3X. Accordingly, the chance of damage to the inner peripheral surface 30a of the transition piece 30 can be further reduced.

Furthermore, according to the configuration described above, the flow guide main body portion 42 of the flow guide 40 has a sector-like shape. Because of this, in the flow channel through the transition piece 30, the supplementary air A2 can be supplied as a film air to a wide region on the downstream side of the connecting pipe C1. Accordingly, the chance of damage to the inner peripheral surface 30a of the transition piece 30 can be further effectively reduced.

The embodiment of the present invention has been described above in detail with reference to the drawings, but the specific configurations are not limited to the embodiment, and design changes and the like that do not depart from the scope of the present invention are also included.

For example, in the embodiment described above, the shape of the opening of the intake hole 32 is not particularly limited. The opening may have a circular cross section, an elliptical cross section, a polygonal cross section, and the like Additionally, in the embodiment described above, the surface of the flow guide 40 is even. The surface of the flow guide 40 may have a groove-like slit (not illustrated) extending in the flow direction to facilitate more effective rectification of the flow of the supplementary air A2 by the flow guide 40. Alternatively, a linear protrusion that extends in the flow direction may be provided on the surface of the flow guide 40.

According to such a configuration in which the flow of the supplementary air A2 can be actively rectified, the flow of the supplementary air A2 in the flow channel through the transition piece 30 can be made uniform.

In the embodiment described above, only one example of the application of the flow guide 40 to the connecting portion C of the combustor 3 has been explained. However, the application target of the flow guide 40 is not limited. For example, the flow guide 40 can be applied to an ignition plug, various measuring devices, and other similar devices provided on the combustor 3 (combustor main body 3X) inserted from a direction that intersects the axial line O and requiring a portion of the device to be exposed in the flow channel of the combustor 3.

INDUSTRIAL APPLICABILITY

According to the combustor and the gas turbine described above, the chance of damage to the combustor can be effectively reduced.

REFERENCE SIGNS LIST

1 Gas turbine
2 Compressor
3 Combustor
4 Turbine
5 Rotor
6 Stator
7 Rotating shaft
8 Annular blade assembly
9 Casino
10 Annular vane assembly
11 Fuel supply unit
12P Pilot burner
12M Main burner
13P Pilot nozzle
13M Main nozzle
20 Combustor basket
20a Inner peripheral surface
20b Outer peripheral surface
21 Base end portion
22 Leading end portion
25 Opening
30 Transition piece
30a Inner peripheral surface
30b Outer peripheral surface
31 Base end portion
32 Intake hole
35 Opening
39 Combustor basket main body portion
40 Flow guide
50 Outlet outer ring
A Compressed air
A2 Supplementary air
C Connecting portion
C1 Connecting pipe
C2 Fixing portion
C3 Connection hole
C4 Inner peripheral surface
C5 Interface portion
G Combustion gas
S1 Gap
S2 Gap

The invention claimed is:

1. A combustor comprising:

a combustor main body comprising a transition piece that defines a flow channel therein, and a combustor basket inserted in the transition piece from an upstream side of the flow channel that sends a combustion gas through the flow channel and defines a gap through which a film air is sent with an inner peripheral surface of the transition piece;

a connecting pipe disposed upstream of an outlet of the gap that connects to the combustor main body from an outer peripheral side, the connecting pipe being provided with a communication hole formed inside the connecting pipe, wherein the communication hole communicates with the flow channel; and a flow guide disposed in the flow channel on a downstream side of a connecting portion of the connecting pipe and the combustor main body that guides a compressed air introduced from outside the connecting pipe so that a flow rate distribution is made uniform in a circumferential direction of the combustor main body, wherein the connecting portion includes an intake hole that connects an inside and an outside of the connecting portion, wherein the flow guide includes:

an introduction portion disposed proximal to the connecting pipe that extends from the intake hole toward the flow channel; and a flow guide main body portion connected to the introduction portion that extends toward a downstream side of the flow channel, and wherein the flow guide main body portion includes an outer edge dimensioned to be concentric with an arcuate cross section of the introduction portion and a pair of free side edges that join together opposite ends of the outer edge and the introduction portion.

2. The combustor according to claim 1, wherein the flow guide main body portion gradually increases in dimension in the circumferential direction toward the downstream side of the flow channel.

3. A gas turbine comprising:

an air compressor;

the combustor according to claim 1; and a turbine driven by the combustion gas generated by the combustor.

4. A gas turbine comprising:

an air compressor;

the combustor according to claim 2; and a turbine driven by the combustion gas generated by the combustor.

* * * * *